(12) United States Patent
Kopetzky et al.

(10) Patent No.: US 6,217,070 B1
(45) Date of Patent: *Apr. 17, 2001

(54) THREE-POINT SAFETY BELT SYSTEM WITH ROLLER DEFLECTION FITTING

(75) Inventors: Robert Kopetzky, Lonsee; Matthias Pleyer, Senden; Sabine Dreizler, Ulm, all of (DE)

(73) Assignee: Takata Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/845,154

(22) Filed: Apr. 21, 1997

(30) Foreign Application Priority Data

Apr. 19, 1996 (DE) .............................. 196 15 625
Jul. 3, 1996 (DE) .............................. 196 26 800

(51) Int. Cl.[7] ................................. G60R 22/00
(52) U.S. Cl. ......................... 280/808; 280/801.1
(58) Field of Search ............... 280/808, 801.1; 297/482, 483, 468

(56) References Cited

U.S. PATENT DOCUMENTS 4,101,171 * 7/1978 Sasaki et al. .
4,327,881 * 5/1982 Föhl ............................. 242/107
4,369,931 * 1/1983 Fohl .

FOREIGN PATENT DOCUMENTS

| 2854635 | * | 10/1980 | (DE) | ........ | 280/808 |
|---|---|---|---|---|---|
| 30 08 371 | * | 9/1981 | (DE) . | | |
| 30 41 103 | * | 8/1982 | (DE) . | | |
| 31 44 527 | * | 5/1983 | (DE) . | | |
| 295 02 192 U | * | 6/1995 | (DE) . | | |
| 295 10 050 U | * | 10/1995 | (DE) . | | |
| 0 078 940 | * | 5/1983 | (EP) . | | |
| 2 174 888 | * | 11/1986 | (GB) . | | |

* cited by examiner

Primary Examiner—Eric Culbreth
(74) Attorney, Agent, or Firm—Foley & Lardner

(57) ABSTRACT

Three-point safety belt system, in particular for motor vehicle seats, comprising a safety belt (2) which can be unwound from a reel (1) and which is guided via a deflection device (3) arranged at the side above the seat and which has a passage opening (4), the lower boundary of which is formed by a deflection roller (9) for the safety belt (2), wherein, to make the drawing out of the safety belt easier and to reduce the wear of the belt (2), the deflection device has at least one further deflection roller (10).

23 Claims, 3 Drawing Sheets

THREE-POINT SAFETY BELT SYSTEM WITH ROLLER DEFLECTION FITTING

BACKGROUND OF THE INVENTION

1. Field of the Invention

The present invention relates to a safety belt system, in particular one for motor vehicle seats, comprising a safety belt system which can be unwound from a reel and which is guided via a deflection device arranged laterally above the seat and having a passage opening, with the lower boundary of the passage opening being formed by a deflection roller for the safety belt.

2. Description of Related Art

The three-point safety belt systems customary in motor vehicles have a reel from which the safety belt can be unwound. This reel is mounted, in particular for the safety belts for the front seats of a motorcar, at the side of the associated seat in the floor region at the so-called B-column. Starting from this reel, the belt is guided over a deflection device arranged at the side above the seat on the B-column and is led from there back again to a second attachment fitting close to the floor for the end of the belt remote from the reel. Between the deflection device and the second attachment fitting close to the floor, the safety belt is guided through the passage of a latch element which cooperates with a belt lock arranged on the other side of the associated seat.

During the reeling in and unreeling of such a safety belt the belt is drawn through the passage opening of the deflection device. In order to keep the friction which arises during this, which loads the belt and which thus leads to wear, as low as possible it is already known to provide a deflection roller over which the safety belt is led in the deflection device. This deflection roller is arranged in the deflection device so that it forms the lower boundary of the passage opening. The jacket of the deflection roller, which has a correspondingly large diameter, thus forms the deflection surface for the safety belt. The belt which is subsequently delivered from below from the unwinding reel and which is largely also drawn off downwardly can thereby be guided largely free of friction.

As a result of the attachment of the deflection device to the B-column, the deflection device however is disposed in a rearward position with respect to the associated vehicle seat. The tension exerted on the belt when putting it on thus has a forwardly directly force component when viewed in the direction of travel which leads to the safety belt wandering on the deflection roller to one side of the passage and abutting against the side boundary there. Likewise, when winding the belt onto the reel, the safety belt wanders in the direction towards the other side boundary of the passage opening and thus abuts against the side boundary there. The belt thereby rubs against these lateral boundaries which can lead to wear and to a premature aging of the belt, which can indeed possibly endanger the trouble-free functioning of the safety belt, because the danger exists that the belt tears at the side. Moreover, the drawing out of the belt is not ideally easy.

SUMMARY OF THE INVENTION

An object of the invention is to provide a three-point safety belt system of the initially named kind such that the drawing out of the belt is facilitated and a deterioration or destruction of the same is prevented.

This object is satisfied in that the deflection device has at least one further roller.

In accordance with an embodiment of the invention at least one guide roller arranged substantially perpendicular to the deflection roller can be provided as the further roller and bounds the passage opening at the side. Through an additional guide roller of this kind it is ensured that the belt, which wanders to a lateral boundary of the passage opening of the deflection device, does not rub against this lateral boundary. In place of this, the belt sets the additional guide roller present there in motion, whereby a substantial reduction of the draw out resistance and of the wear of the belt is achieved. In order to reduce the wear of the two lateral boundary regions of the belt during both unwinding and during winding up, two additional guide rollers are preferably provided which bound the passage opening of the deflection device on both sides of the deflection roller.

In accordance with a further embodiment of the invention the jacket of the lateral guide rollers directly adjoins the jacket of the deflection roller. In this way it is ensured that the respective lateral guide roller is immediately set in rotation by the belt wandering towards this side. It also prevents the belt from being drawn into a gap.

The jacket surface of the lateral rollers is in each case preferably concave. This ensures in a particularly advantageous manner that the belt runs onto the side roller in a jerk-free and kink-free manner.

The object underlying the invention is on the other hand solved in that the lower boundary of the passage opening is formed by a deflection surface and that a part of the deflection surface is formed by the jacket of at least one deflection roller.

It has been shown that the use of a deflection surface with at least one inserted deflection roller makes it relatively easy to draw out the belt. In this respect it is advantageous when the deflection surface is gently curved in the passage direction of the belt band and the deflection rollers have a radius of curvature which is smaller in comparison to the radius of curvature of the deflection surface. The slightly curved deflection surface prevents the belt from being bent too much in the deflection device, which would make drawing out the belt more difficult. Through the relatively smaller deflection rollers, easy running of the deflection rollers is ensured on the one hand, whereby the drawing out of the belt is likewise made easier.

In accordance with a further development of the invention the deflection rollers are distributed over the deflection surface, with preferably two or three deflection rollers arranged substantially parallel to one another. The use of two or three deflection rollers has shown itself to be particularly advantageous since the two or three rollers, in particular when these are arranged distributed over the deflection surface, ensure, on the one hand, a very low friction on the pulling through of the belt and, on the other hand, only a small rolling resistance is present. Moreover, the design with two or three rollers can be executed at favorable cost.

In accordance with a further embodiment of the invention a plain bearing is in each case provided for the journalling of the lateral rollers and/or of the deflection rollers. This is uncomplicated to manufacture technically and thus cost-favorable.

The deflection rollers and/or the lateral rollers are preferably journalled in a plastic part which can be placed in jacket-like manner on a hoop, preferably consisting of metal. This also simplifies the manufacture and makes it less expensive because the bearing means for all the rollers can be formed in the plastic part. The hoop part which preferably comprises metal or another stable material thereby ensures an adequately firm anchorage of the safety belt in the case of a heavy loading, such as arises during an accident.

In accordance with a further development of the invention the bearings for the deflection rollers and the lateral guide rollers can be covered by at least one cover part which can preferably be clipped on. This design simplifies the assembly of the arrangement of the invention since the rollers can simply be inserted into the plastic part and the cover part subsequently only has to be clipped on.

The jacket surfaces of the deflection rollers and/or of the lateral guide rollers can be made smooth in accordance with a further design of the invention. In accordance with another design of the invention it is however also possible to structure the jacket surfaces in order to influence the wandering movement of the belt to the lateral boundaries of the passage opening in the deflection device.

BRIEF DESCRIPTION OF THE DRAWINGS

Embodiments of the invention are shown in the drawings and will be described with respect to following detailed description of the preferred embodiments.

DETAILED DESCRIPTION OF THE PREFERRED EMBODIMENTS

Figure 1:
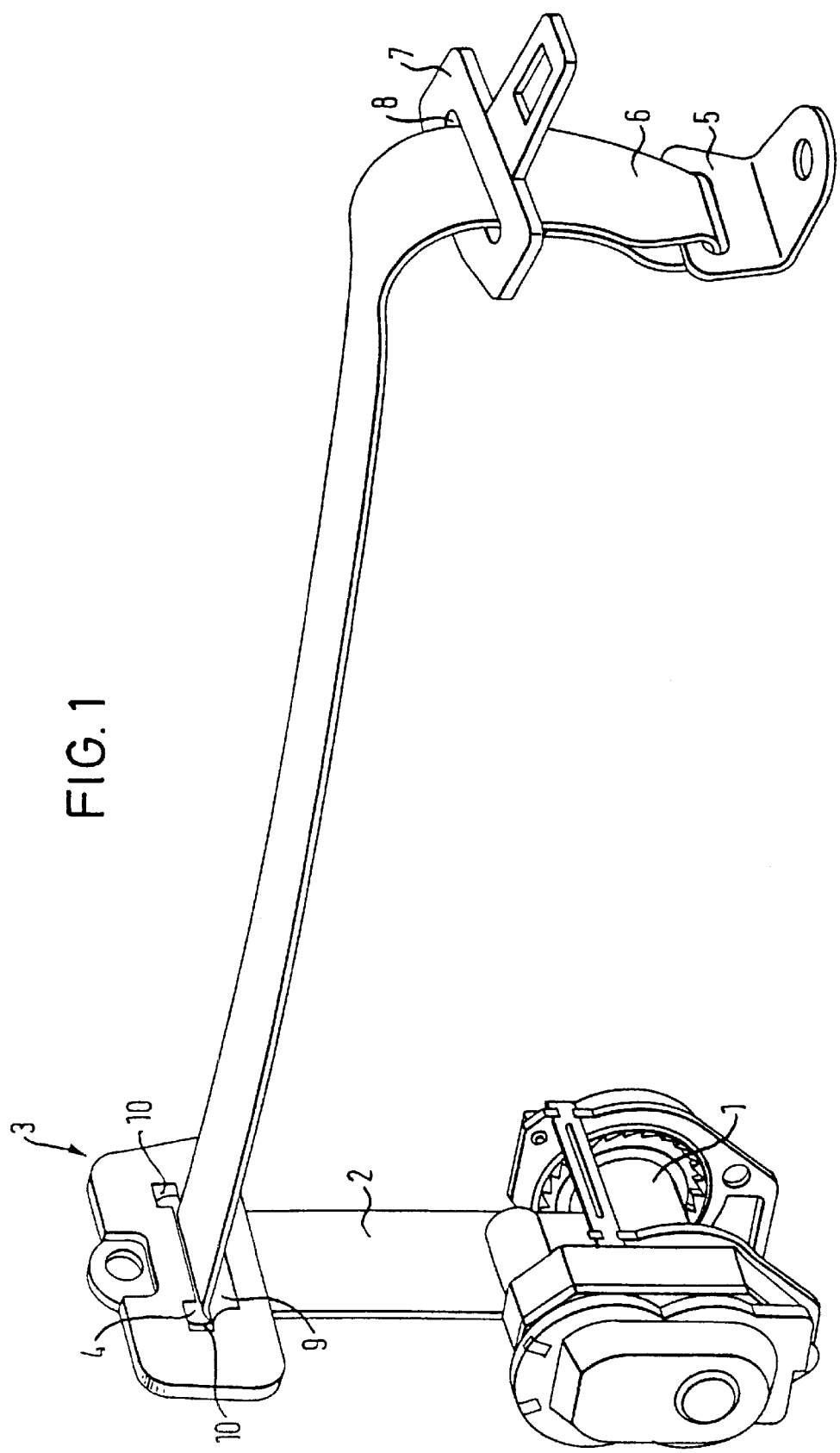
FIG. 1 a perspective illustration of the safety belt system of the invention.

FIG. 1 shows the important parts of the three-point safety belt system of the invention, namely a reel 1 from which the safety belt 2 can be unwound, an upper deflection device 3 with a passage opening 4 through which the safety belt 2 is guided, a lower attachment fitting 5 for the end 6 of the safety belt 2 remote from the reel, and a latch element 7, which has a passage 8 for the safety belt 2, provided between the upper deflection device 3 and a lower attachment fitting 5. The latch element cooperates with a belt lock, which is not shown here, at the side of the associated vehicle seat remote from the reel 1, with the vehicle seat likewise not being shown here.

The upper deflection device 3 has a deflection roller 9 which bounds the bottom of the passage opening 4 of the deflection device 3. In addition to the deflection roller 9, two lateral rollers or guide rollers 10 are provided in the deflection device 3 and bound the passage opening 4 of the deflection device 3 at the sides. The safety belt 2, which is supplied to the deflection device 3 from below and drawn away from it obliquely downwardly and forwardly, is in this manner guided largely free of friction through the passage opening 4 of the deflection device 3.

If the safety belt wanders, during unwinding or reeling in, to one side of the passage opening 4 of the deflection device 3, then it runs onto one of the lateral rollers 10 formed with a concave jacket surface, so that it is also laterally guided substantially free of friction through the passage opening 4 of the deflection device 3. As a result of the concave jacket surface of the side rollers 10, which moreover adjoin the jacket of the deflection roller 9 in a flush manner, it is ensured that the safety belt 2 runs free of impact and free of kinks onto the side rollers 10. The loading of the belt is thereby very greatly reduced so that the loading of the side edge regions of the belt and the danger of tearing associated therewith is correspondingly reduced.

Figure 2:
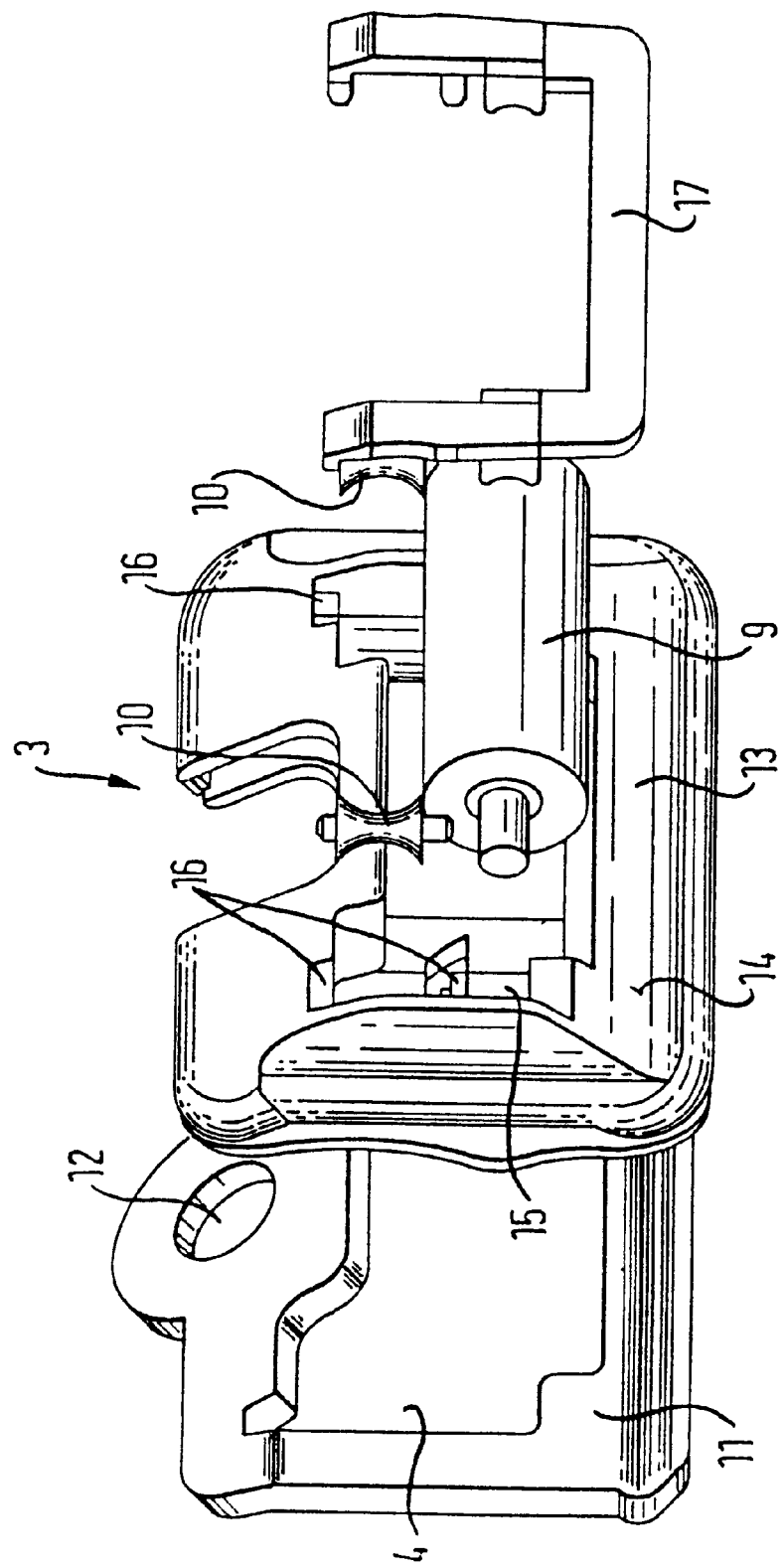
FIG. 2 a detail of FIG. 1 in an enlarged exploded illustration.

The design of the deflection device 3 is shown in detail in FIG. 2. A housing 13 formed in two parts is mounted onto a hoop part 11 which preferably comprises metal and which has a passage 12 for a fitting bolt which is not shown here for the attachment of the deflection device to the motor vehicle. The housing 13 consists of a jacket part 14 which can be attached to the hoop part 11 and in which the bearings or mountings 15 and 16 for the deflection roller 9 and for the side guide rollers 10 are formed. The second housing part is formed as a cover part 17 which can be clipped into place and which covers over the bearings 15 and 16 of the deflection roller 9 and of the side guide rollers 10 towards the front. Through this design, the deflection roller 9 and the lateral guide rollers 10 can be simply inserted from the front into the associated bearings 15 and 16 and are securely held there by the cover part 17 which can be simply clipped into place. Through this design both the manufacture and also the assembly of the deflection device 3 are simplified.

The force which has to be borne in an accident by the deflection device 3 is directed by the hoop part 11, which is preferably formed of metal, to the motor vehicle. The plastic part 13 must in contrast only bear the forces which occur during the normal operation of the safety belt 2.

Figure 3:
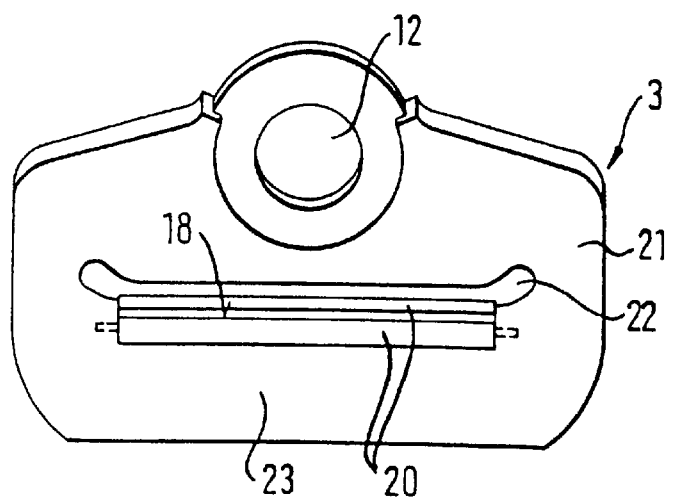
FIG. 3 a plan view of the deflection device of a variant of the safety belt system of the invention, FIG. 4 a cross-section through the deflection device of FIG. 3, and FIG. 5 a perspective illustration of the deflection device of a further variant of the safety belt system of the invention.
Figure 4:
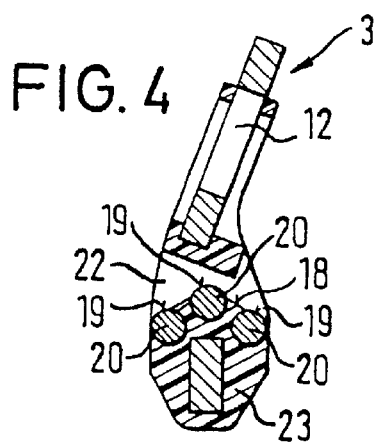
Figure 5:
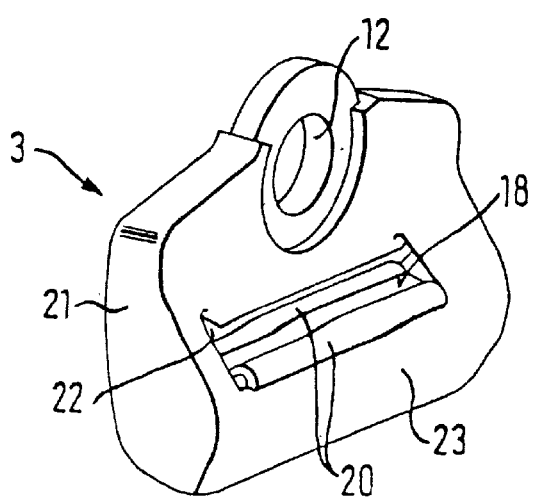

In FIGS. 3 to 5 there is in each case shown only the deflection device 3 of two further variants of the safety belt system of the invention. The deflection device 3 thereby consists in each case of a plastic sheathed metal hoop 21 which has a passage opening 22 for the belt band 2.

The lower boundary of the passage opening 22 is in each case formed by a deflection surface 18 which is gently curved in the passage direction of the belt 2 and into which deflection rollers 20 are inserted in such a way that the jacket 19 of the deflection rollers 20 in each case forms a part of the deflection surface 18. The part of the deflection surface 18 remaining between the jackets 19 of the deflection rollers 20 is formed by the associated lower transverse strut or limb 23 of the hoop 21.

In the variant shown in FIGS. 3 and 4, three deflection rollers 20 are arranged parallel to one another, are provided, of which one is respectively associated with each of the belt inlet side end and the belt outlet side end of the deflection surface 18, whereas the third deflection roller 20 is provided at the center of the deflection surface 18, i.e. its jacket 19 forms the apex of the curved deflection surface 18.

In the variant shown in FIG. 5, two deflection rollers 20 are arranged parallel to one another and are respectively arranged approximately at the belt inlet side end and the belt outlet side end of the passage opening 22. Through this arrangement, a deflection of the belt 2 with gentle curvature is also made possible.

In both variants, the radii of curvature of the deflection rollers 20 journalled in the hoop 21 are smaller than the radius of curvature of the deflection surface 18 so that the rolling resistance of the deflection rollers 20 is likewise small. Through the distributed arrangement of two or three deflection rollers 20 over the deflection surface 18 a smaller draw out resistance of the belt 2 is achieved. It is fundamentally possible to provide more than three deflection rollers or even only a single roller with a small radius of curvature. When only a single deflection roller is provided it is preferably located at the center of the deflection surface 18, i.e. forms its apex point.

The draw out resistance of the belt 2 is kept low in a cost-favorable manner by the safety belt system of the invention and the wear of the belt 2 is significantly reduced. The danger of lateral tearing of the belt 2, which can arise in known belts by scraping of the belt at the fixed edges, is reduced by the side guide rollers 10.

The entire contents of German Patent Application 196 15 625.4, filed Apr. 19, 1996 and German Patent Application 196 26 800.1, filed Jul. 3, 1996, are hereby incorporated by reference.

Reference Numeral List 1. winding reel
2. belt
3. deflection device
4. passage opening
5. attachment fitting
6. end of 2 remote from reel
7. latch element
8. passage
9. deflection roller
10. guide roller
11. hoop part
12. passage
13. plastic part
14. jacket part
15. bearing of 9
16. bearing of 10
17. cover part
18. deflection surface
19. jacket
20. deflection roller
21. hoop
22. passage opening
23. transverse strut

What is claimed is:

1. A three-point safety belt system comprising:
   a safety belt, which can be unwound from a reel;
   a deflection device arranged laterally above a seat and having a passage opening (4) for guiding the safety belt, wherein a lower boundary of the passage opening is formed by a deflection roller has at least one guide roller extending perpendicular to the deflection roller and which laterally bounds the passage opening.

2. A three-point safety belt system in accordance with claim 1, wherein the at least one guide roller includes two guide rollers bounding both sides of the passage opening of the deflection device.

3. A three-point safety belt system in accordance with claim 1, wherein each of the deflection roller and the at least one guide roller has a jacket and the jacket of each of the at least one guide roller directly adjoins the jacket of the deflection roller.

4. A three-point safety belt system in accordance with claim 1, wherein the at least one guide roller has a concave jacket surface.

5. A three-point safety belt system in accordance with claim 1, wherein the deflection device includes a sliding bearing for journalling at least one of the at least one guide roller and the deflection roller.

6. A three-point safety belt system in accordance with claim 1, wherein the deflection device includes:
   a hoop part adapted for fastening to a vehicle; and
   a plastic housing attached to the hoop part for journalling the deflection roller and the at least one guide roller.

7. A three-point safety belt system in accordance with claim 6, wherein the deflection device includes a plurality of bearings for the deflection roller and the at least one guide roller, and at least one cover part covering the plurality of bearings.

8. A three-point safety belt system in accordance with claim 1, wherein each of the deflection roller and the at least one guide roller has a jacket having a surface, wherein the jacket surfaces of the deflection roller and the at least one guide roller are even.

9. A three-point safety belt system in accordance with claim 1, wherein the deflection device includes at least one further deflection roller at a lower boundary of the passage opening, wherein each of the deflection rollers has a jacket and wherein a part of a deflection surface is formed by the jackets of the deflection rollers.

10. A three-point safety belt system in accordance with claim 9, wherein the deflection surface is evenly curved in a passage direction of the belt.

11. A three-point safety belt system in accordance with claim 9, wherein the deflection rollers have a smaller radius of curvature in comparison to a radius of curvature of the deflection surface.

12. A three-point safety Pelt system in accordance with claim 9, wherein the deflection rollers are distributed over the deflection surface.

13. A three-point safety belt system in accordance with claim 9, wherein there are only two deflection rollers which are substantially parallel to one another.

14. A three-point safety belt system in accordance with claim 9, wherein there are three deflection rollers which are substantially parallel to one another.

15. A three-point safety belt system comprising:
    a safety belt which can be unwound from a reel; and
    a deflection device, arranged laterally above a seat, having a passage opening, a deflection surface for guiding the safety belt, and at least two elongated deflection rollers on one side of the safety belt, each of the at least two elongated deflection rollers having a jacket and a smaller radius of curvature compared to a radius of curvature of the deflection surface,
    wherein the deflection surface is partly formed by a surface of the jackets; and
    wherein the deflection surface is evenly curved in the passage direction of the belt.

16. A three-point safety belt system in accordance with claim 15, wherein the deflection rollers are distributed over the deflection surface.

17. A three-point safety belt system in accordance with claim 15, wherein the at least two elongated deflection rollers comprise two deflection rollers which are substantially parallel to one another.

18. A three-point safety belt system in accordance with claim 15, wherein the at least two elongated deflection rollers comprise three deflection rollers which are substantially parallel to one another.

19. A three-point safety belt system in accordance with claim 15, wherein the deflection device includes a slide bearing for journalling at least one of the at least two elongated deflection rollers.

20. A three-point safety belt system in accordance with claim 15, wherein the deflection device includes:

a hoop part adapted for fastening to a vehicle; and a housing for journalling the at least two elongated deflection rollers.

21. A three-point safety belt system in accordance with claim 15, wherein at least one of the jacket surfaces of the deflection rollers is even.

22. Three-point safety belt system in accordance with claim 15, wherein at least one of the jacket surfaces is uneven.

23. A three-point safety belt system comprising:

a safety belt which can be unwound from a reel; and a deflection device, arranged laterally above a seat, having a passage opening and a deflection surface for guiding the safety belt, the deflection device including a hoop part adapted for fastening to a vehicle; at least two deflection rollers, each of the at least two deflection rollers having a jacket; a housing for journalling the at least two deflection rollers; and at least one cover part for covering the housing, wherein the deflection surface is partly formed by a surface of the jackets.

* * * * *